US012596264B2

(12) United States Patent
Zhu et al.

(10) Patent No.: US 12,596,264 B2
(45) Date of Patent: Apr. 7, 2026

(54) DISPLAY APPARATUS

(71) Applicant: Shenzhen Optiave Display Technologies Co. Limited, Shenzhen (CN)

(72) Inventors: Liangfu Zhu, Shenzhen (CN); Yisheng Zhu, Shenzhen (CN); Tapani Kalervo Levola, Shenzhen (CN)

(73) Assignee: Shenzhen Optiave Display Technologies Co. Limited, Shenzhen (CN)

( * ) Notice: Subject to any disclaimer, the term of this patent is extended or adjusted under 35 U.S.C. 154(b) by 554 days.

(21) Appl. No.: 17/985,960

(22) Filed: Nov. 14, 2022

(65) Prior Publication Data

US 2024/0126093 A1    Apr. 18, 2024

(30) Foreign Application Priority Data

Oct. 12, 2022    (CN) ......................... 202211248634.X

(51) Int. Cl.
*G02B 27/10* (2006.01)
*F21V 8/00* (2006.01)
*G02B 27/01* (2006.01)

(52) U.S. Cl.
CPC ....... *G02B 27/1086* (2013.01); *G02B 6/0026* (2013.01); *G02B 6/005* (2013.01); *G02B 27/106* (2013.01); *G02B 27/0101* (2013.01)

(58) Field of Classification Search
CPC .. G02B 27/1086; G02B 6/0026; G02B 6/005; G02B 27/106; G02B 27/0101
USPC .......................................... 359/630; 345/7–9
See application file for complete search history.

(56) References Cited

U.S. PATENT DOCUMENTS

2018/0299860 A1    10/2018    Regan
2020/0018828 A1    1/2020    Lyu

FOREIGN PATENT DOCUMENTS

| CN | 107430217 A | 12/2017 |
| CN | 108681067 A | 10/2018 |
| CN | 208721896 U | 4/2019 |
| CN | 210243962 U | 4/2020 |
| CN | 210835313 U | 6/2020 |
| CN | 111902765 A | 11/2020 |
| CN | 112415656 A | 2/2021 |
| CN | 112558307 A | 3/2021 |
| CN | 112654900 A | 4/2021 |

(Continued)

OTHER PUBLICATIONS

Chinese OA for 202211248634.X Mailed on Sep. 14, 2024.
International Search Report for PCT/CN2023/087969 Mailed on May 30, 2023.

*Primary Examiner* — William Choi
(74) *Attorney, Agent, or Firm* — Rivka Friedman

(57) ABSTRACT

A display apparatus includes an optical engine and a stack of expander devices. The optical engine forms input light which comprises a plurality of input light beams representing an input image. The stack of expander devices forms output light by diffractively expanding the input light. The output light includes a plurality of output light beams representing the input image. The stack includes a first expander device and a second expander device. The grating period of each diffractive element of the first expander device is equal to the grating period of a corresponding diffractive element of the second expander device.

18 Claims, 11 Drawing Sheets

(56)　　　　　References Cited

FOREIGN PATENT DOCUMENTS

| | | | | | |
|---|---|---|---|---|---|
| CN | 113050221 | A | | 6/2021 | |
| CN | 113168003 | A | | 7/2021 | |
| CN | 114185131 | A | | 3/2022 | |
| CN | 114779397 | A | * | 7/2022 | ......... G02B 27/0172 |
| CN | 114859554 | A | | 8/2022 | |
| CN | 115079427 | A | | 9/2022 | |
| CN | 115145042 | A | * | 10/2022 | |
| CN | 115373062 | A | | 11/2022 | |
| CN | 115480413 | A | | 12/2022 | |
| EP | 3528032 | A2 | | 8/2019 | |
| EP | 3588150 | A1 | | 1/2020 | |
| JP | 2003233293 | A | | 8/2003 | |
| WO | 2017180408 | A1 | | 10/2017 | |

* cited by examiner

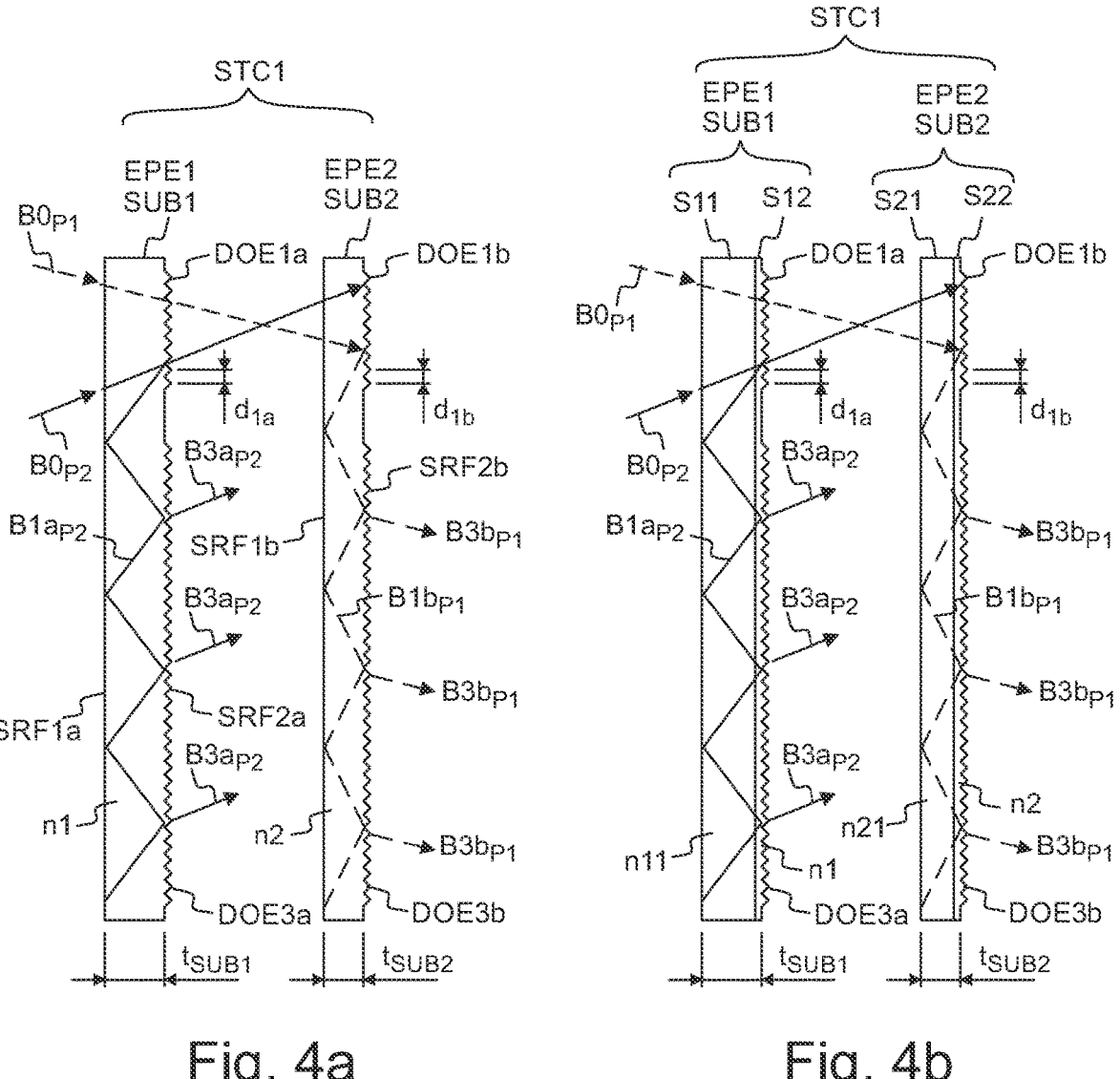
Fig. 4a                              Fig. 4b

Standard deviation of angular intensity distribution in the eye box

Standard deviation of spatial intensity distribution in the eye box

DISPLAY APPARATUS

CROSS REFERENCE TO RELATED APPLICATION

This application claims the priority of Chinese Patent Application No. 202211248634.X, entitled "DISPLAY APPARATUS" and filed on Oct. 12, 2022, the disclosure of which is incorporated herein by reference in its entirety.

FIELD

The present invention relates to a display apparatus, which comprises a diffractive beam expander.

BACKGROUND

Referring to FIG. 1, a known display apparatus comprises an optical engine ENG1 and a diffractive expander device EPE0. The display apparatus may display a virtual image by diffractively expanding light beams provided by the optical engine ENG1. The diffractive expander device EPE0 provides an enlarged eye box BOX1 for viewing the displayed virtual image. The diffractive expander device EPE0 comprises a waveguide plate SUB0, an in-coupling element DOE1, and an out-coupling element DOE3. The optical engine ENG1 forms input light IN1. The input light IN1 comprises input light beams $B0_{P1}$, $B0_{P2}$, which propagate in different directions, which correspond to different image points (P1, P2) of an input image (IMG0).

The diffractive expander device EPE0 forms output light by diffractively expanding light beams of the input light IN1. The diffractive expander device EPE0 forms an output light beam $B3_{P1}$ by diffractively expanding the input light beam $B0_{P1}$. The diffractive expander device EPE0 forms an output light beam $B3_{P2}$ by diffractively expanding the input light beam $B0_{P2}$.

The in-coupling element DOE1 forms guided light $B1_{P1}$, $B1_{P2}$ by diffracting the input light IN1. The guided light $B1_{P1}$, $B1_{P2}$ propagates within the waveguide plate SUB0. The out-coupling element DOE3 forms output light beams $B3_{P1}$, $B3_{P2}$ by diffracting guided light (e.g. $B1_{P1}$, $B1_{P2}$) out of the waveguide plate SUB0. An observer may view the displayed virtual image when the output light beams $B3_{P1}$, $B3_{P2}$ impinge on the eye EYE1 of the observer. The output light beams may together constitute output light.

The output light may exhibit spatial non-uniformity and/or angular non-uniformity. For example, the intensity of the output light beam $B3_{P1}$ may become lower with increasing distance from the in-coupling element DOE1. For example, the intensity of an output light beam $B3_{P1}$ projected from a predetermined point of the out-coupling element DOE3 may be lower than the intensity of a different output light beam $B3_{P2}$ projected from said predetermined point, in a test situation where the corresponding input light beams $B0_{P1}$, $B0_{P2}$ propagate in different directions but have equal intensity.

SUMMARY

An object is to provide a display apparatus, which comprises diffractive expander devices. An object is to provide a method for displaying an image. An object is to provide a method for producing the display apparatus.

According to an aspect, there is provided a display apparatus, comprising:

an optical engine to form input light, which comprises a plurality of input light beams representing an input image; and a stack of expander devices to form output light by diffractively expanding the input light, wherein the output light comprises a plurality of output light beams representing said input image, wherein the stack comprises a first expander device and a second expander device, wherein the first expander device comprises a first group of diffractive elements, which contribute to the direction of the output light beams, wherein the second expander device comprises a second group of diffractive elements, which contribute to the direction of the output light beams, wherein the first expander device comprises a first in-coupling element to diffract the input light into a waveguiding plate of the first expander device, wherein the first expander device is arranged to transmit a part of the input light to the second expander device, wherein the second expander device comprises a second in-coupling element to diffract the transmitted part of the input light into a waveguiding plate of the second expander device, wherein the grating period of each element of the first group is equal to the grating period of a corresponding element of the second group.

The scope of protection sought for various embodiments of the invention is set out by the independent claims. The embodiments, if any, described in this specification that do not fall under the scope of the independent claims are to be interpreted as examples useful for understanding various embodiments of the invention.

The display apparatus comprises an optical engine to form input light. The input light comprises a plurality of input light beams, which represent the points of an input image. The direction of each input light beam may correspond to the position of an image point of the input image, and the intensity of said input light beam may correspond to the brightness of said image point.

The display apparatus comprises a stack of diffractive expander devices to form output light from the input light. The output light comprises a plurality of output light beams, which represent the points of the input image. The stack forms the output light beams by diffractively expanding the input light beams.

The stack comprises a first expander device and a second expander device. The first expander device comprises a first in-coupling element to diffract input light into a waveguiding plate of the first expander device. The first in-coupling element allows a part of the input light to be transmitted through the first expander device to the second expander device. The second expander device comprises a second in-coupling element to diffract a transmitted part of the input light into a waveguiding plate of the second expander device.

The first expander device comprises a first out-coupling element to form first output light beams by diffracting guided light out of the waveguiding plate of the first expander device. The second expander device comprises a second out-coupling element to form second output light beams by diffracting guided light out of the waveguiding plate of the second expander device. The first output light beams projected by the first out-coupling element may be transmitted through the second expander device to the eye of an observer. The output light may be formed as the combination of the first output light beams and the second output light beams.

The thicknesses of the waveguiding plates and/or the refractive indices of the in-coupling elements may be selected such that output light beams provided by the second expander device may at least partly compensate spatial non-uniformity of output light beams provided by the first expander device.

The thicknesses of the waveguiding plates and/or the refractive indices of the in-coupling elements may be selected such that output light beams provided by the second expander device may at least partly compensate angular non-uniformity of output light beams provided by the first expander device.

The thicknesses of the waveguiding plates and/or the refractive indices of the in-coupling elements may be selected such that output light beams provided by the second expander device may at least partly compensate spatial and/or angular non-uniformity of output light beams provided by the first expander device.

According to the invention, the grating period of the first in-coupling element is equal to the grating period of the second in-coupling element.

The first expander device comprises a first group of diffractive elements, which contribute to the direction of the output light beams. The second expander device comprises a second group of diffractive elements, which contribute to the direction of the output light beams. The grating period of each element of the first group may be equal to the grating period of the corresponding element of the second group.

Using the stack of expander devices instead of an individual expander device may e.g. allow improving spatial and/or angular uniformity of output light projected by the stack. Having the same grating period in both expander devices may facilitate production of the stack.

The diffractive elements may be produced by using lithographic techniques. For example, one or more embossing tools may be produced by e-beam lithography, and the diffractions grating of the diffractive elements may be formed by using the one or more embossing tools. A replica of the diffractive microstructure of the embossing tool may be formed on the waveguide plate e.g. by using the embossing tool as a mold, or by pressing the surface of the waveguide plate with the embossing tool.

The in-coupling elements of both expander devices may be produced by using the same embossing tool. Using the same embossing tool for both expander devices may reduce manufacturing costs. Using the same embossing tool for both expander devices may eliminate the risk of additional positioning errors caused by using an additional embossing tool for producing the in-coupling element of the second expander device.

Having the same grating period in both expander devices may improve the quality of the displayed image. Having the same grating period in both expander devices may help to avoid image blurring caused by manufacturing tolerances.

According to a comparative example, having a slightly erroneous grating period in the second expander device may cause that output light beams projected from the second expander device may propagate in a slightly erroneous direction, which in turn can be observed as blurring of a displayed image point.

Having the same grating period in both expander devices may help to ensure that output light beams projected by both expander devices are parallel with each other, in a situation where the output light beams correspond to the same point of the displayed image. The stack and the same grating period may facilitate displaying a sharp image.

According to an embodiment, the display apparatus may be arranged to display a monochromatic image. For example, the display apparatus may be arranged to display a green monochromatic image. The thicknesses and the refractive indices of the waveguide plates may be selected so as to optimize angular and spatial uniformity of the output light, in a situation where the input light formed by the optical engine corresponds to a uniform monochromatic test image.

According to an embodiment, the display apparatus may be arranged to display a multi-color image, e.g. an RGB image. The RGB image comprises a red sub-image, a green sub-image, and a blue sub-image. The thicknesses and the refractive indices of the waveguide plates may be selected so as to optimize angular and spatial uniformity of the output light, in a situation where the input light formed by the optical engine corresponds to a uniform RGB test image.

Having the same grating period(s) in both expander devices may improve brightness of the displayed image, even in a situation where the first expander device and the second expander device have the same thickness and the same refractive index.

BRIEF DESCRIPTION OF THE DRAWINGS

In the following examples, several variations will be described in more detail with reference to the appended drawings, in which FIG. 4b shows, by way of example, in a side view, a display apparatus, wherein the waveguiding plate of the first expander device is formed of two different layers.

DETAILED DESCRIPTION

Figure 1:
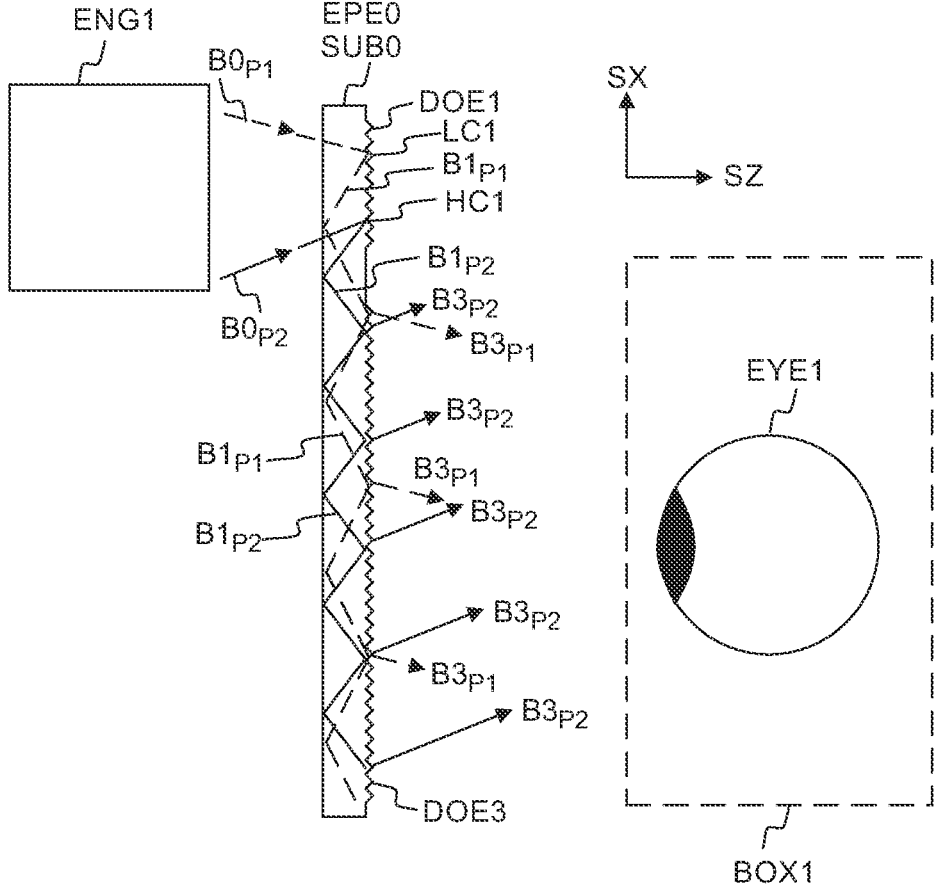
FIG. 1 shows a known display apparatus.
Figure 2:
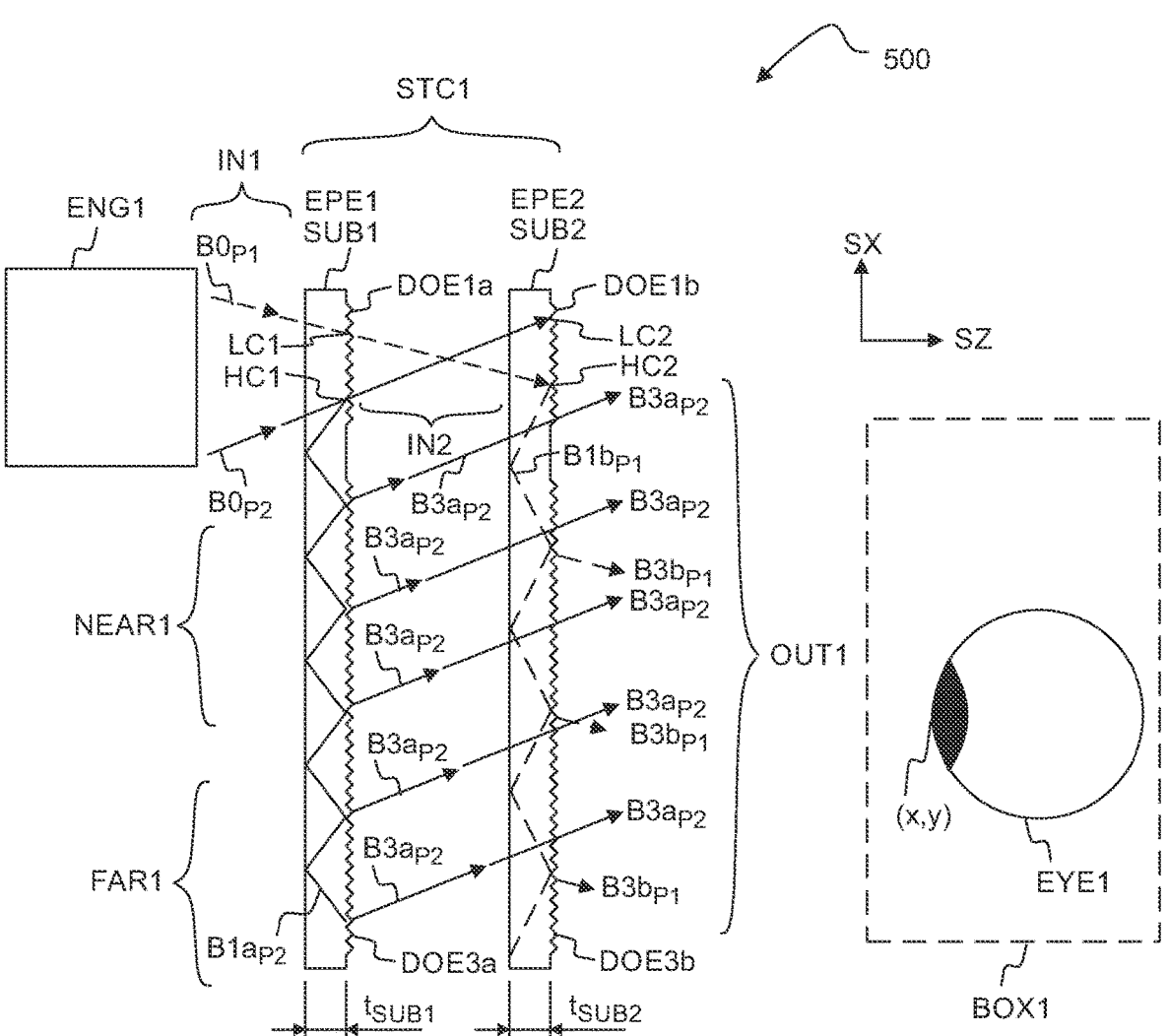
FIG. 2 shows, by way of example, in a side view, a display apparatus, which comprises a stack of diffractive expander devices.

Referring to FIG. 2, the display apparatus 500 comprises an optical engine ENG1, and a stack STC1 of diffractive expander devices EPE1, EPE2.

The optical engine ENG1 may provide input light IN1, which comprises a plurality of input light beams $B0_{P1}$, $B0_{P2}$, which represent image points P1, P2 of an input image IMG0. The display apparatus 500 may receive input light IN1 from the optical engine ENG1.

The stack STC1 may comprise two or more expander devices. The stack STC1 comprises at least a first expander device EPE1, and a second expander device EPE2. The stack STC1 of the expander devices EPE1, EPE2 provide output light OUT1. The expander devices EPE1, EPE2 may operate such that the output light OUT1 comprises output light beams $B3a_{P1}$, $B3a_{P2}$, $B3b_{P1}$, $B3b_{P2}$, which represent the image points P1, P2.

Figure 3A:
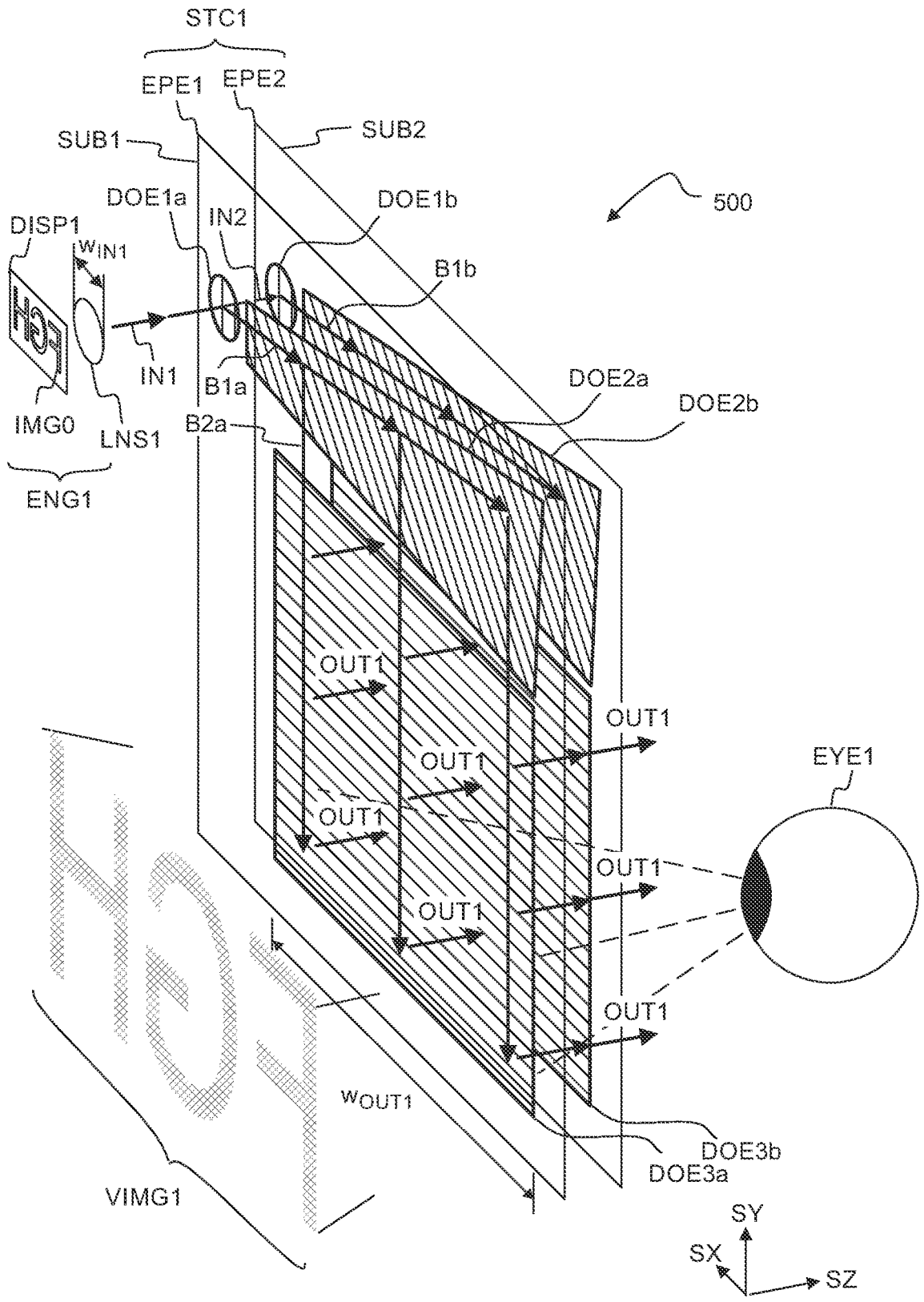
FIG. 3a shows, by way of example, in a three-dimensional view, a display apparatus, which comprises a stack of diffractive expander devices.

An observer may see the displayed virtual image VIMG1 when the output light OUT1 impinges on the eye EYE1 of the observer (FIG. 3*a*). The display apparatus 500 has an eye box BOX1, which refers to the space where the eye EYE1 can be positioned to view the displayed virtual image.

The first expander device EPE1 comprises a first waveguide plate SUB1, which in turn comprises several diffractive elements, which contribute to the direction of light in an optical path. The first waveguide plate SUB1 may comprise an in-coupling element DOE1*a*, an expander element DOE2*a*, and an out-coupling element DOE3*a*. The in-coupling element DOE1*a* may form first guided light B1*a* by diffracting input light IN1 into the waveguide plate SUB1. The expander element DOE2*a* may form second guided light B2*a* by diffracting the first guided light B1*a*. The out-coupling element DOE3*a* may form output light OUT1 by diffracting the second guided light B2*a* out of the waveguide plate SUB1. The output light OUT1 diffracted by the out-coupling element DOE3*a* may comprise e.g. output light beams $B3a_{P1}$, $B3a_{P2}$ (see FIG. 7*f*). The first expander device EPE1 may comprise a first group GRP1 of diffractive elements DOE1*a*, DOE2*a*, DOE3*a*, which contribute to the direction of the output light beams of the output light OUT1 (see FIG. 6*a*).

A part of the input light IN1 may propagate through the first expander device EPE1 to the in-coupling element DOE1*b* of the second expander device EPE2. The part of the input light IN1 which is transmitted through the first input element DOE1*a* to the second in-coupling element DOE1*b* may also be called e.g. as transmitted input light IN2.

The second expander device EPE2 may comprise a second waveguide plate SUB2, which in turn may comprise the in-coupling element DOE1*b*, an expander element DOE2*b*, and an out-coupling element DOE3*b*. The in-coupling element DOE1*b* may form third guided light B1*b* by diffracting transmitted input light IN2 into the waveguide plate SUB1.

Figure 3B:
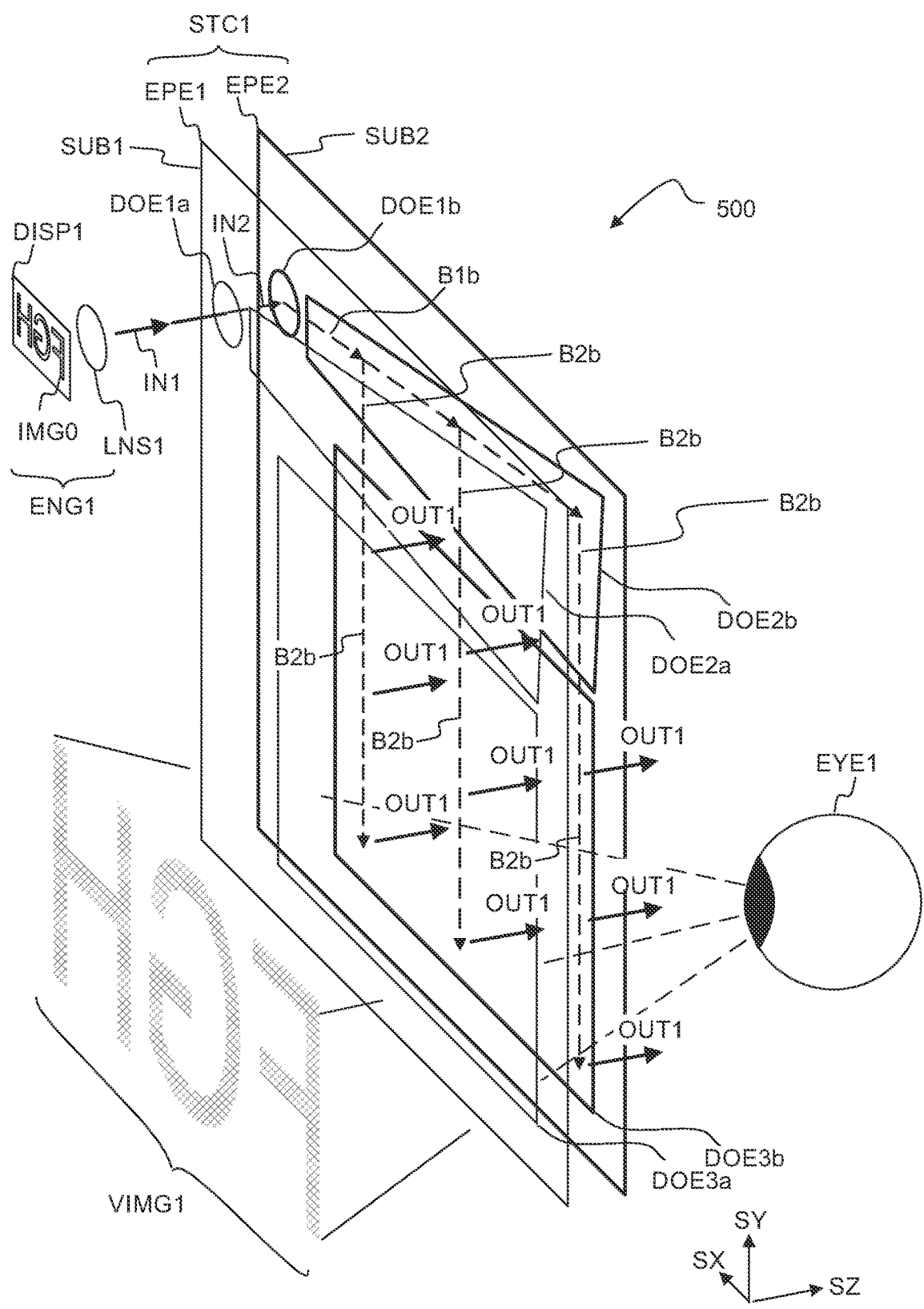
FIG. 3b shows, by way of example, in a three-dimensional view, propagation of guided light in the second diffractive expander device of FIG. 3a, FIG. 4a shows, by way of example, in a side view, a display apparatus, wherein the thickness of the waveguiding plate of the first expander device is different from the thickness of the waveguiding plate of the second expander device.

The expander element DOE2*b* may form fourth guided light B2*b* by diffracting the third guided light B1*b* (see FIG. 3*b*). The out-coupling element DOE3*b* may form output light OUT1 by diffracting the fourth guided light B2*b* out of the second waveguide plate SUB2.

Figure 6A:
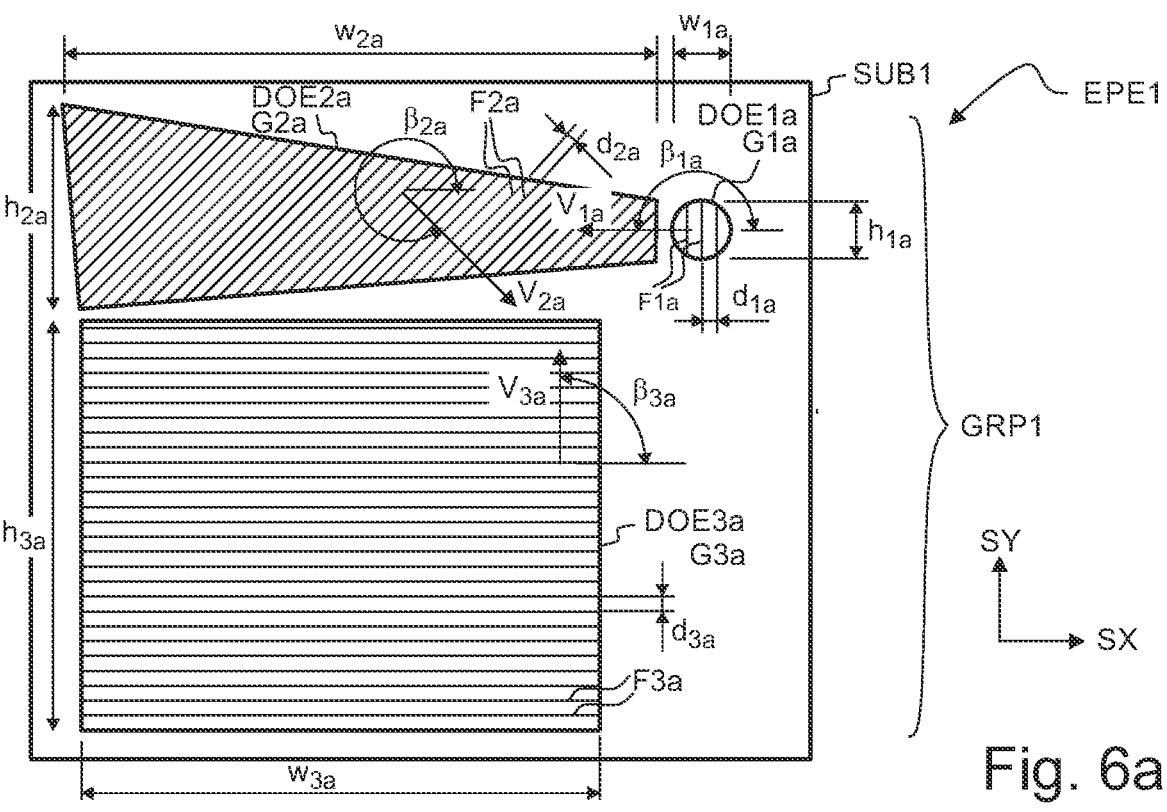
FIG. 6a shows, by way of example, dimensions of the first expander device.
Figure 6B:
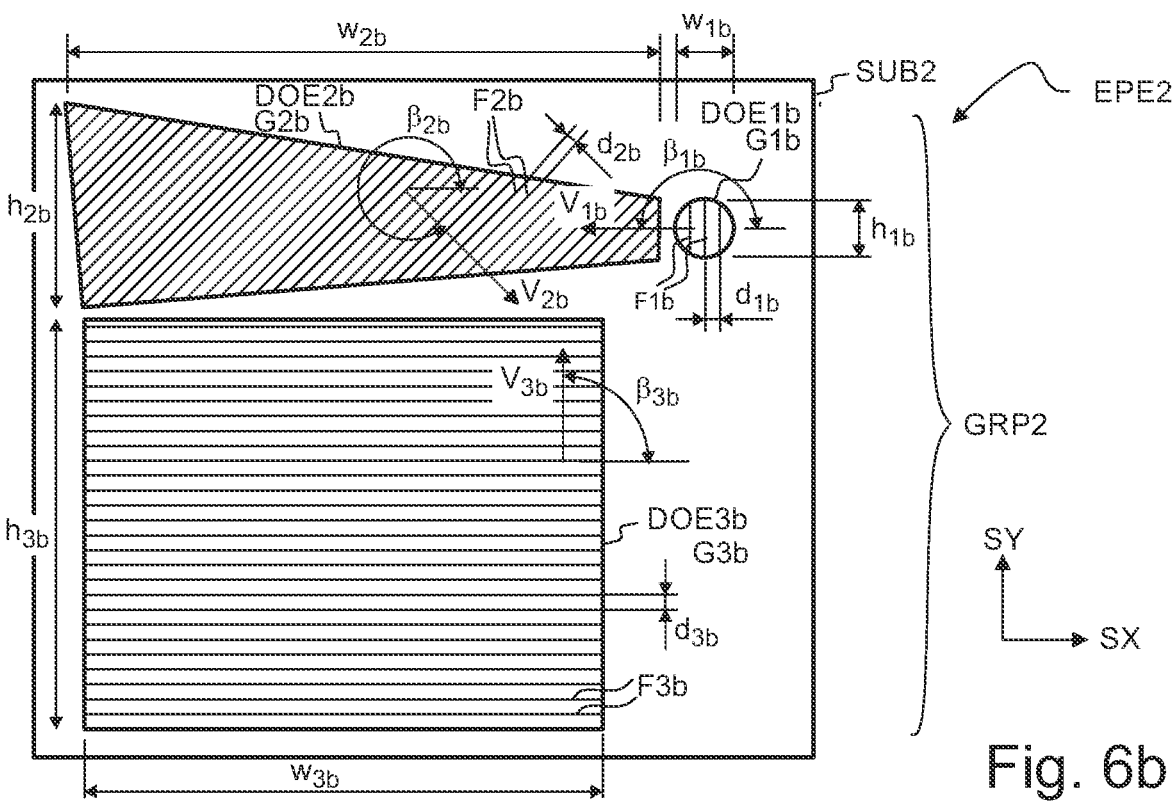
FIG. 6b shows, by way of example, dimensions of the second expander device.
Figures 7A, 7B, 7C, 7D:
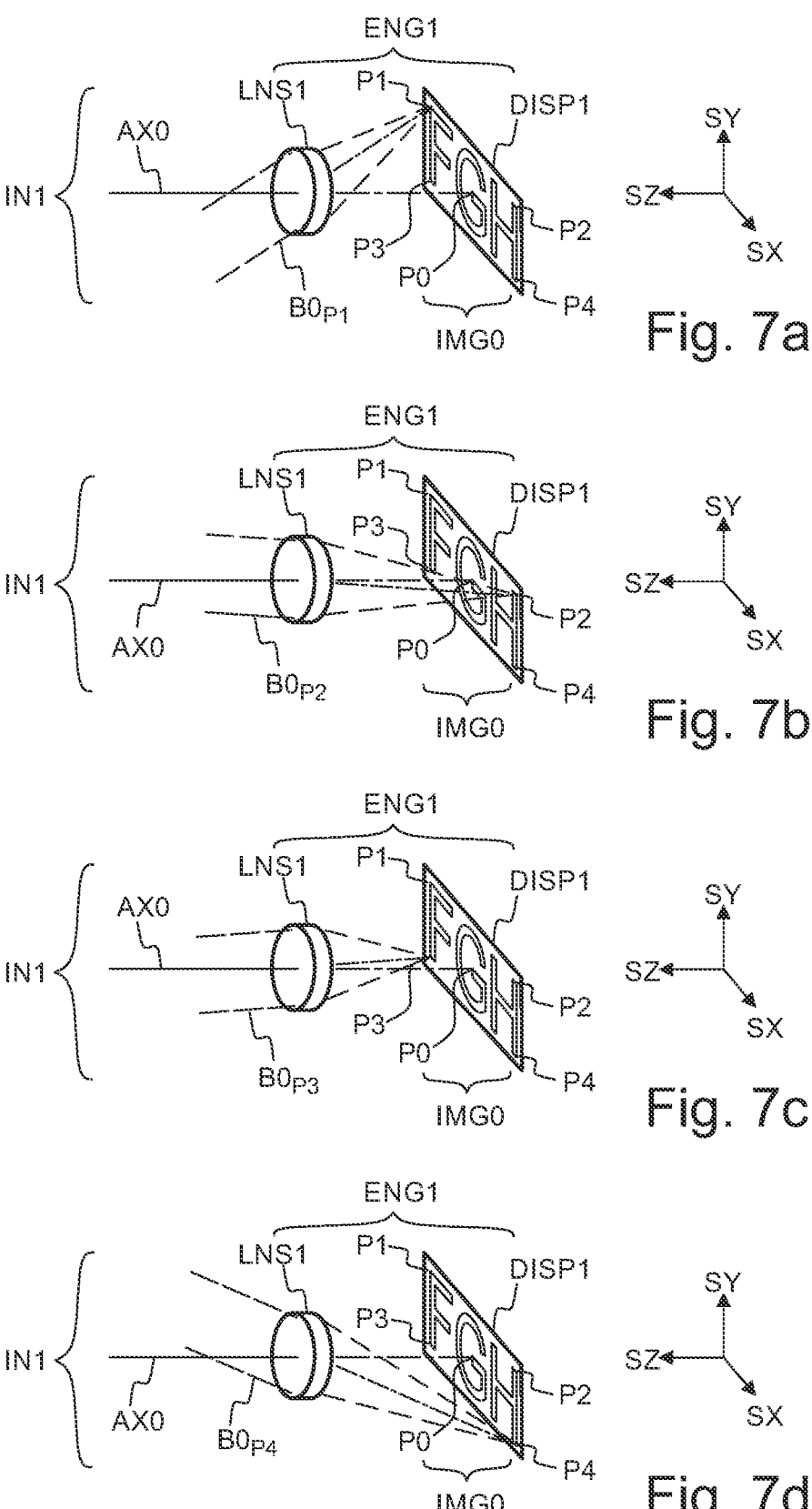
FIG. 7*f* shows, by way of example, in a three-dimensional view, viewing a displayed virtual image.
FIG. 7*g* shows, by way of example, angular width of the displayed virtual image.
FIG. 7*h* shows, by way of example, angular height of the displayed virtual image.
Figure 7E:
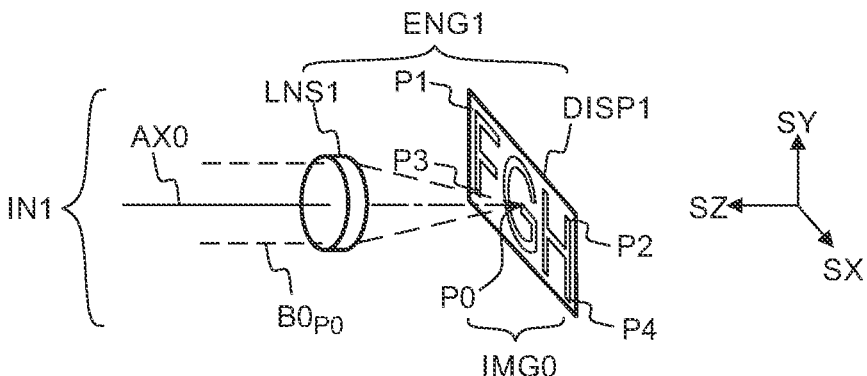
Figure 7F:
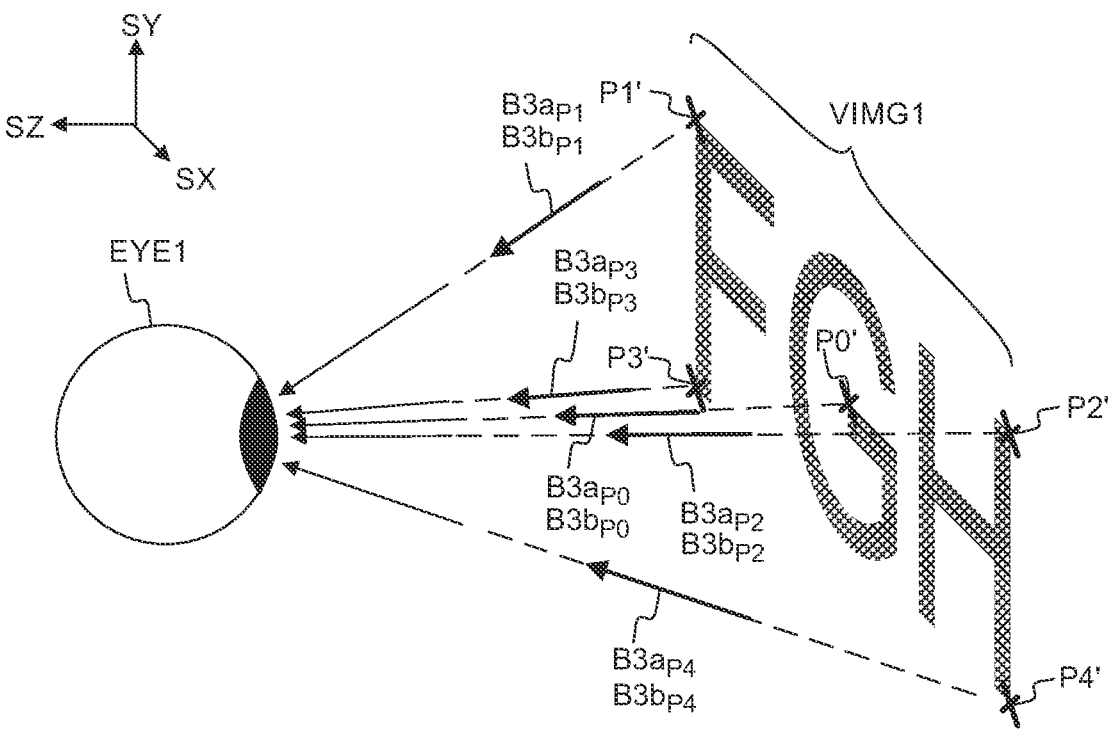

The output light OUT1 diffracted by the out-coupling element DOE3*b* may comprise output light beams $B3b_{P1}$, $B3b_{P2}$ (FIG. 7*f*). The second expander device EPE2 may comprise a second group GRP2 of diffractive elements DOE1*b*, DOE2*b*, DOE3*b*, which contribute to the direction of the output light beams of the output light OUT1 (see FIG. 6*b*)

Output light diffracted by the out-coupling element DOE3*a* of the first expander device EPE1 may be transmitted through the out-coupling element DOE3*b* of the second expander device EPE2 to the eye EYE1 of the observer. Output light OUT1 provided by the display apparatus 500 may be formed as a combination of the output light provided by the first expander device EPE1 and output light provided by the second expander device EPE2.

SX, SY, and SZ denote orthogonal directions. The waveguiding plate SUB1, may be in a plane defined by the directions SX and SY.

The waveguide plate SUB1 of the expander device EPE1 may have major surfaces SRF1*a*, SRF2*a*, which are parallel with each other (FIG. 4*a*). The waveguide plate SUB2 of the expander device EPE2 may have major surfaces SRF1*b*, SRF2*b*, which are parallel with each other.

The symbols LC1, LC2 denote a lower coupling efficiency, and the symbols HC1, HC2 denote a higher coupling efficiency.

Input light beams $B0_{P1}$, $B0_{P2}$ representing different image points P1, P2 propagate in different directions. The first in-coupling element DOE1*a* may have different diffraction efficiencies for diffracting the input light beams $B0_{P1}$, $B0_{P2}$ into the waveguide plate SUB1. For example, the first in-coupling element DOE1*a* may have a lower coupling efficiency LC1 for diffracting the input light beam $B0_{P1}$ into the waveguide plate SUB1, and the first in-coupling element DOE1*a* may have a higher coupling efficiency HC1 for diffracting the input light beam $B0_{P2}$ into the waveguide plate SUB1.

The in-coupling element DOE1*b* of the second expander EPE2 may have different diffraction efficiencies for diffracting the input light beams $B0_{P1}$, $B0_{P2}$ into the waveguide plate SUB2. For example, the in-coupling element DOE1*b* may have a higher coupling efficiency HC2 for diffracting the input light beam $B0_{P1}$ into the waveguide plate SUB2, and the in-coupling element DOE1*b* may have a lower coupling efficiency LC2 for diffracting the input light beam $B0_{P2}$ into the waveguide plate SUB2.

A first coupling efficiency function $\eta_{EPE1}(x, y, \varphi, \theta)$ may represent the efficiency of the first expander device EPE1 to form an output light beam from light of an input light beam, as the function of the position (x, y) on the out-coupling element DOE3*a*, and as the function of the direction $(\varphi, \theta)$ of said output light beam. The position may be specified e.g. by position coordinates (x, y). The angles $\varphi$, $\theta$ may specify the direction of the output light beam.

A second coupling efficiency function $\eta_{EPE2}(x, y, \varphi, \theta)$ may represent the efficiency of the second expander device EPE2 to form an output light beam from light of an input light beam, as the function of the position (x, y) on the out-coupling element DOE3*b*, and as the function of the direction $(\varphi, \theta)$ of said output light beam.

The first waveguiding plate SUB1 may have a thickness $t_{SUB1}$. The second waveguiding plate SUB2 may have a thickness $t_{SUB2}$. The in-coupling element DOE1$a$ may have a refractive index n1. The in-coupling element DOE1$b$ may have a refractive index n2 (FIG. 4$a$, 4$b$). The refractive index of a diffractive element may refer to the refractive index of the microscopic diffractive features of said diffractive element.

The refractive indices n1,n2 and/or thicknesses $t_{SUB1}$, $t_{SUB2}$ may be selected e.g. such that the second in-coupling efficiency function $\eta_{EPE2}$(x, y, φ, θ) is different from the first in-coupling efficiency function $\eta_{EPE1}$(x, y, φ, θ).

The refractive indices n1,n2 and/or thicknesses $t_{SUB1}$, $t_{SUB2}$ may be selected e.g. such that the second in-coupling efficiency function $\eta_{EPE2}$(x, y, φ, θ) may at least partly compensate spatial and/or angular non-uniformity of the first in-coupling efficiency function $\eta_{EPE1}$(x, y, φ, θ).

The thicknesses ($t_{SUB1}$, $t_{SUB2}$) of the waveguiding plates (SUB1,SUB2) and/or refractive indices (n1, n2) of the diffractive elements (DOE1$a$, DOE1$b$) may be selected such that output light OUT1 projected by the second expander device (EPE2) may at least partly compensate non-uniformity of output light OUT1 projected by the first expander device (EPE1).

For example, the stack STC1 may be arranged to at least partly compensate a difference between the intensity of output light provided from a region (NEAR1) close to the in-coupling element DOE1$a$, and the intensity of output light provided from a region (FAR1) farther away from the in-coupling element DOE1$a$, when considering output light which represents a given image point (e.g. P1).

Referring to FIGS. 3$a$ and 3$b$, the display apparatus 500 comprises an optical engine ENG1, and a stack STC1 of diffractive expander devices EPE1, EPE2.

The optical engine ENG1 may comprise a display DISP1 and collimating optics LNS1. The display DISP1 may be arranged to display the input image IMG0. The display DISP1 may also be called e.g. as a micro display. The display DISP1 may also be called e.g. as a spatial intensity modulator. The input image IMG0 may also be called e.g. as a primary image. The input image IMG0 may comprise a plurality of image points P1, P2. The optical engine ENG1 may comprise collimating optics LNS1 to form collimated input light beams from light of the image points P1, P2. The optical engine ENG1 forms input light IN1, which comprises input light beams, which represent different image points P1, P2 of the input image IMG0.

The engine ENG1 may be optically coupled to the in-coupling elements DOE1$a$, DOE1$b$. The stack STC1 of expander devices EPE1,EPE2 may carry virtual image content obtained from the light engine ENG1 to the front of a user's eye EYE1. The expander devices EPE1,EPE2 may expand the viewing pupil, thus enlarging the eye box BOX1.

The first expander devices EPE1 may comprise diffractive elements DOE1$a$, DOE2$a$, DOE3$a$. The in-coupling element DOE1$a$ may form first guided light B1$a$ by diffracting the input light IN1. The expander element DOE2$a$ may form second guided light B2$a$ by diffracting the first guided light B1$a$. The out-coupling element DOE3$a$ may form output light beams (B3$a_{P1}$, B3$a_{P2}$) by diffracting the second guided light B2$a$.

A transmitted part IN2 of the input light IN1 may be transmitted through the element DOE1$a$ to the element DOE1$b$. The transmitted input light IN2 may propagate e.g. substantially in the direction SZ.

The second expander devices EPE2 may comprise diffractive elements DOE1$b$, DOE2$b$, DOE3$b$. The in-coupling element DOE1$b$ may form third guided light B1$b$ by diffracting the transmitted input light IN2. The expander element DOE2$b$ may form fourth guided light B2$b$ by diffracting the third guided light B1$b$. The out-coupling element DOE3$b$ may form output light beams (B3$b_{P1}$, B3$b_{P2}$) by diffracting the fourth guided light B2$b$.

The expander devices EPE1,EPE2 may diffractively expand light. The width $w_{OUT1}$ of the output light beams of the output light OUT1 may be greater than the width $w_{IN1}$ of the input light beams of the input light IN1. The eye EYE1 of an observer may see the displayed virtual image VIMG1 when the output light OUT1 impinges on the eye EYE1. The displayed virtual image VIMG1 may represent the input image IMG0.

The first output light beams projected by the first out-coupling element may be transmitted through the second expander device to the eye of an observer. The output light may be formed as the combination of the first output light beams and the second output light beams.

The guided light may be confined to the waveguide plate SUB1 by total internal reflection (TIR). The term guided light means herein the same as the term waveguided light.

Referring to FIG. 4$a$, the thickness $t_{SUB2}$ of the second waveguide plate SUB2 may be different from the thickness $t_{SUB1}$ of the first waveguide plate SUB1, and/or the refractive index n2 of the in-coupling element DOE1$b$ of the second waveguide plate SUB2 may be different from the refractive index n1 of the in-coupling element DOE1$a$ of the first waveguide plate SUB1. The different thicknesses and/or the different refractive indices may e.g. allow at least partial compensation of a non-uniformity of the coupling efficiency function $\eta_{EPE1}$(x, y, φ, θ).

The grating period $d_{1a}$ of the in-coupling element DOE1$a$ may be equal to the grating period $d_{1b}$ of the in-coupling element DOE1$b$.

The display apparatus (500) may comprise:
an optical engine (ENG1) to form input light (IN1), which comprises a plurality of input light beams (B0$_{P1}$, B0$_{P2}$) representing an input image (IMG0),
a stack (STC1) of expander devices (EPE1, EPE2) to form output light (OUT1) by diffractively expanding the input light (IN1), wherein the output light (OUT1) comprises a plurality of output light beams (B3$a_{P1}$, B3$a_{P2}$, B3$b_{P1}$,B3$b_{P2}$) representing said input image (IMG0),
wherein the stack (STC1) comprises a first expander device (EPE1) and a second expander device (EPE2),
wherein the first expander device (EPE1) comprises a first in-coupling element (DOE1$a$) to diffract the input light (IN1) into a waveguiding plate (SUB1) of the first expander device (EPE1),
wherein the first expander device (EPE1) is arranged to transmit a part (IN2) of the input light (IN1) to the second expander device (EPE2),
wherein the second expander device (EPE2) comprises a second in-coupling element (DOE1$b$) to diffract the transmitted part (IN2) of the input light (IN1) into a waveguiding plate (SUB2) of the second expander device (EPE2),
wherein the grating period ($d_{1a}$) of the first in-coupling element (DOE1$a$) is equal to the grating period ($d_{1b}$) of the second in-coupling element (DOE1$b$).

The display apparatus (500) may comprise:
an optical engine (ENG1) to form input light (IN1), which comprises a plurality of input light beams (B0$_{P1}$, B0$_{P2}$) representing an input image (IMG0),
a stack (STC1) of expander devices (EPE1, EPE2) to form output light (OUT1) by diffractively expanding the input light (IN1), wherein the output light (OUT1)

comprises a plurality of output light beams (B3$a_{P1}$, B3$a_{P2}$, B3$b_{P1}$,B3$b_{P2}$) representing said input image (IMG0), wherein the stack (STC1) comprises first expander device (EPE1) and second expander device (EPE2), wherein the grating period ($d_{1a}$, $d_{2a}$, $d_{3a}$) of each diffractive element (DOE1$a$, DOE2$a$, DOE3$a$) of the first expander device (EPE1) is equal to the grating period ($d_{1b}$, $d_{2b}$, $d_{3b}$) of a corresponding diffractive element (DOE1$b$, DOE2$b$, DOE3$b$) of the second expander device (EPE2).

The display apparatus 500 may comprise:

an optical engine (ENG1) to form input light (IN1), which comprises a plurality of input light beams (B0$_{P1}$, B0$_{P2}$) representing an input image (IMG0), a stack (STC1) of expander devices (EPE1, EPE2) to form output light (OUT1) by diffractively expanding the input light (IN1), wherein the output light (OUT1) comprises a plurality of output light beams (B3$a_{P1}$, B3$a_{P2}$, B3$b_{P1}$,B3$b_{P2}$) representing said input image (IMG0), wherein the stack (STC1) may comprise a first expander device (EPE1) and a second expander device (EPE2), wherein the first expander device (EPE1) may comprise a first group (GRP1) of diffractive elements (DOE1$a$, DOE2$a$, DOE3$a$), which contribute to the direction of the output light beams (B3$a_{P1}$,B3$a_{P2}$), wherein the second expander device (EPE2) may comprise a second group (GRP2) of diffractive elements (DOE1$b$, DOE2$b$, DOE3$b$), which contribute to the direction of the output light beams (B3$b_{P1}$,B3$b_{P2}$), wherein the first expander device (EPE1) may comprise a first in-coupling element (DOE1$a$) to diffract the input light (IN1) into a waveguiding plate (SUB1) of the first expander device (EPE1), wherein the first expander device (EPE1) may be arranged to transmit a part (IN2) of the input light (IN1) to the second expander device (EPE2), wherein the second expander device (EPE2) may comprise a second in-coupling element (DOE1$b$) to diffract the transmitted part (IN2) of the input light (IN1) into a waveguiding plate (SUB2) of the second expander device (EPE2), wherein the grating period ($d_{1a}$, $d_{2a}$, $d_{3a}$) of each element (DOE1$a$, DOE2$a$, DOE3$a$) of the first group (GRP1) may be equal to the grating period ($d_{1b}$, $d_{2b}$, $d_{3b}$) of a corresponding element (DOE1$b$, DOE2$b$, DOE3$b$) of the second group (GRP2).

Figure 6C:
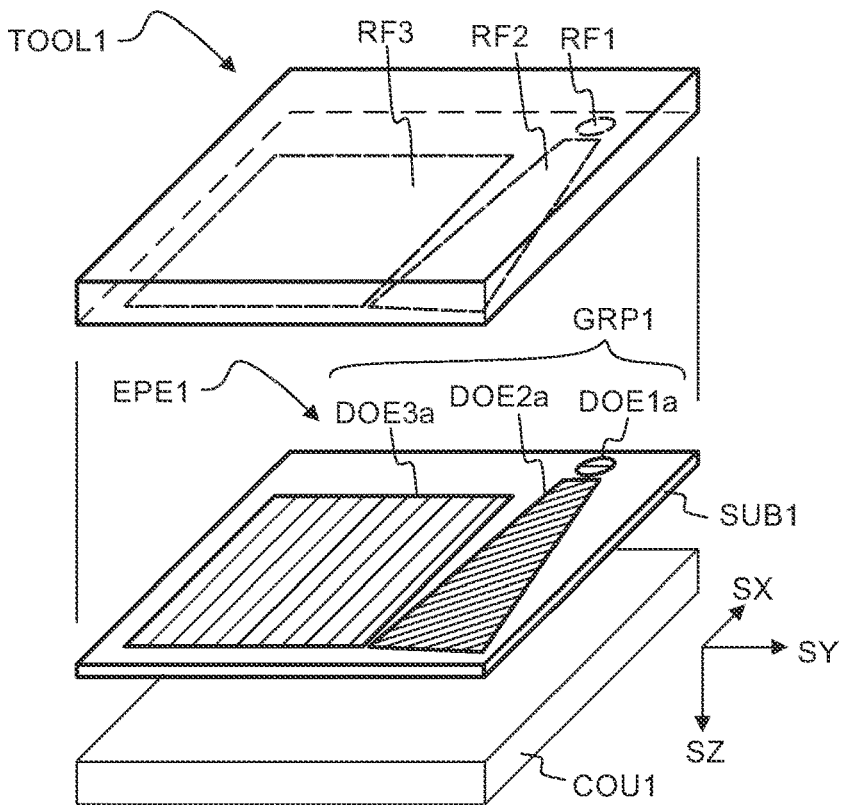
FIG. 6c shows, by way of example, in a three-dimensional view, producing the first expander device by using an embossing tool.
Figure 6D:
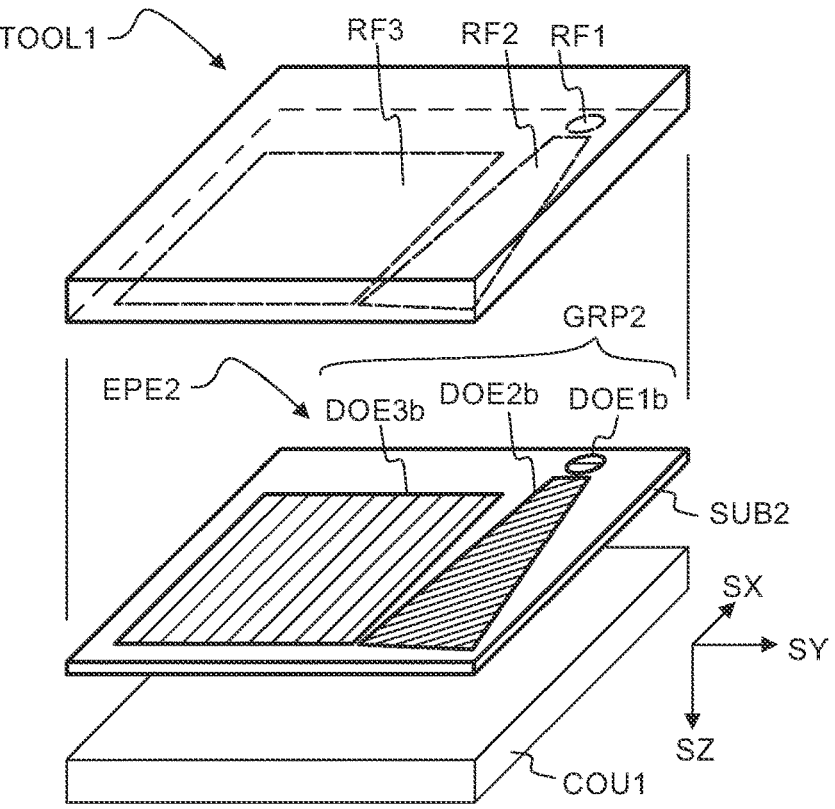
FIG. 6*d* shows, by way of example, in a three-dimensional view, producing the second expander device by using the embossing tool of FIG. 6*c*, FIGS. 7*a* to 7*e* show, by way of example, in a three-dimensional view, forming input light beams by using an optical engine.

The equal grating periods ($d_{1a}$, $d_{1b}$) may facilitate production of the apparatus 500, as the expander devices EPE1, EPE2 may be produced e.g. by using the same embossing tool TOOL1 (FIGS. 6c, 6d).

The equal grating periods ($d_{1a}$, $d_{1b}$) may provide improved uniformity of the displayed image VIMG1, while reducing or eliminating the risk of mismatch between the directions of output light beams formed by the first expander device EPE1 and the directions of output light beams formed by the second expander device EPE2.

Referring to FIG. 4b, the first waveguide plate SUB1 and/or second waveguide plate SUB2 may be formed of one or more material layers (S11, S12, S21, S22). The waveguide plate (SUB1, SUB2) of at least one of the expander devices (EPE1,EPE2) may be formed of two or more material layers (S11,S12). The use of two or more different material layers may provide additional freedom for selecting the refractive indices (n11, n1, n21, n2) of the materials. The additional freedom may be used e.g. for providing suitable coupling efficiency functions $\eta_{EPE1}$(x, y, $\varphi$, $\theta$), $\eta_{EPE2}$(x, y, $\varphi$, $\theta$).

The first waveguide plate SUB1 may comprise or consist of two or more material layers S11,S12. The second waveguide plate SUB2 may comprise or consist of two or more material layers S21,S22. The material layers S11, S12, S21, S22 may be transparent so as to allow guiding of light.

A transparent substrate S11 may be coated with a transparent coating material layer S12. The in-coupling element DOE1$a$ may be formed on the coating material layer S12. The substrate S11 may have a refractive index n11. The coating material layer S12 may have a refractive index n1.

A transparent substrate S21 may be coated with a transparent coating material layer S22. The in-coupling element DOE1$b$ may be formed on the coating material layer S22. The substrate S21 may have a refractive index n21. The coating material layer S22 may have a refractive index n2.

The display apparatus 500 has an eye box BOX1, which refers to the space where the eye EYE1 can be positioned to view the displayed virtual image VIMG1 (FIG. 2).

Figure 5A:
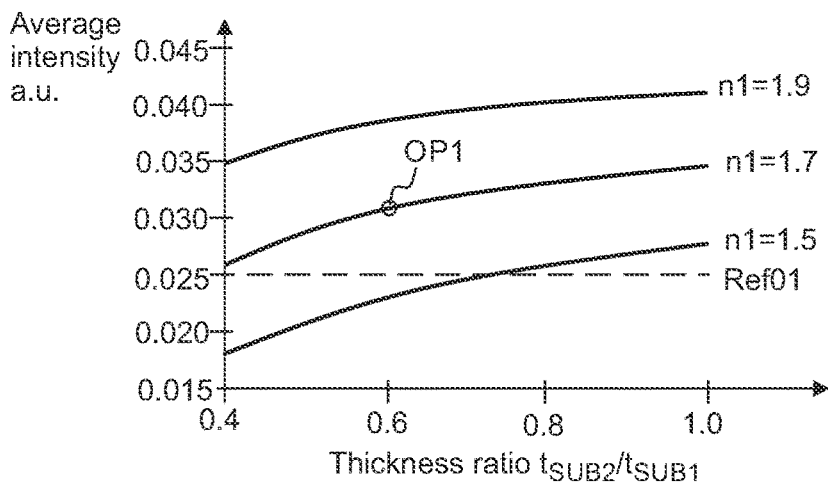
FIG. 5a shows, by way of example, average intensity in the eye box, as the function of the thickness ratio, for several different refractive indices of the waveguiding plate of the first expander device.

FIG. 5a shows, by way of example, average intensity in the eye box BOX1, as the function of the thickness ratio $t_{SUB2}/t_{SUB1}$, for three different refractive index values n1=1.5, n1=1.7, n1=1.9. The refractive index n2=1.9.

The grating period of each diffractive element (DOE1$a$, DOE2$a$, DOE3$a$) of the first expander device EPE1 is equal to the grating period of the corresponding diffractive element (DOE1$b$, DOE2$b$, DOE3$b$) of the second expander device EPE2. In other words, $d_{1a}=d_{1b}$, $d_{2a}=d_{2b}$, $d_{3a}=d_{3b}$. In this example, the input image IMG0 is uniform, i.e. all image points of the input image IMG0 have equal brightness.

OP1 denotes an operating point where the thickness ratio $t_{SUB2}/t_{SUB1}=0.6$, the refractive index n1=1.7, and the refractive index n2=1.9.

Ref01 denotes the average intensity in the eye box BOX1 in a comparative example, where the display apparatus of the comparative example comprises only one expander device (EPE2). The average intensity in the operating point OP1 is substantially higher (+24%) than the average intensity Ref01 of the comparative example. The marking a.u. means arbitrary unit.

The display apparatus 500 may be arranged to display the virtual image VIMG1 with a sufficient degree of uniformity, in a situation where the input image IMG0 is uniform. Spatial uniformity and/or angular uniformity may be optimized. The display apparatus 500 may be arranged to provide a sufficient degree of spatial uniformity, and the display apparatus 500 may also be arranged to provide a sufficient degree of directional uniformity.

The display apparatus 500 may provide substantially uniform angular distribution of intensity in the eye box BOX1, and the display apparatus 500 may also provide substantially uniform spatial distribution intensity in the eye box BOX1, in a test situation where the input image IMG0 is uniform (i.e. all points of the input image have equal brightness).

Directional uniformity means that output light beams propagating in different directions have equal intensity, in a situation where the input image is uniform. Thus, directional uniformity means that different points P1, P2 of the displayed virtual image VIMG1 have equal brightness, when observed by an eye EYE1, which is within the eye box BOX1. The degree of directional uniformity may be indicated e.g. by standard deviation of angular intensity distribution. A lower standard deviation indicates a higher degree of uniformity.

Figure 5B:
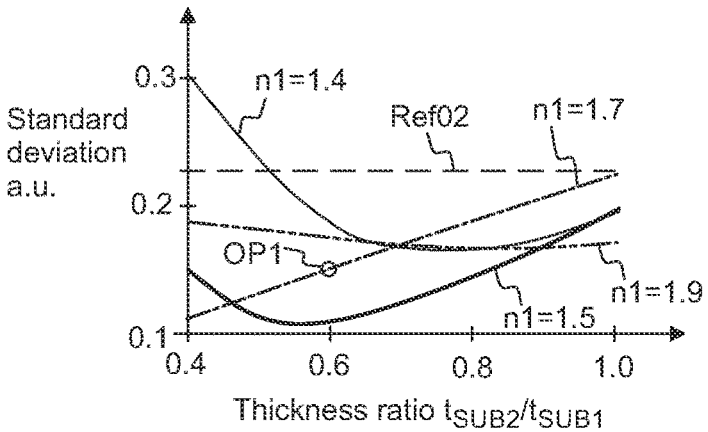
FIG. 5b shows, by way of example, standard deviation of the angular intensity distribution in the eye box, as the function of the thickness ratio, for several different refractive indices of the waveguiding plate of the first expander device.

FIG. 5b shows, by way of example, standard deviation of the angular intensity distribution, as a function of the thickness ratio $t_{SUB2}/t_{SUB1}$, for four different refractive index values n1=1.4, n1=1.5, n1=1.7, n1=1.9. The standard deviation of FIG. 5b represents differences between intensities of output light beams propagating in different directions ($\varphi$, $\theta$).

The grating period of each diffractive element (DOE1a, DOE2a, DOE3a) of the first expander device EPE1 is equal to the grating period of the corresponding diffractive element (DOE1b, DOE2b, DOE3b) of the second expander device EPE2. In other words, $d_{1a}=d_{1b}$, $d_{2a}=d_{2b}$, $d_{3a}=d_{3b}$. In this example, the input image IMG0 is uniform, i.e. all image points of the input image IMG0 have equal brightness.

Ref02 denotes the standard deviation of the angular intensity distribution in the eye box BOX1 in the comparative example, where the display apparatus of the comparative example comprises only one expander device (EPE2). The standard deviation of the angular intensity distribution in the operating point OP1 is substantially lower (by 30%) than the standard deviation (Ref02) of the angular intensity distribution of the comparative example.

Spatial uniformity means that the intensity of the output light beams remains constant in a situation where the position (x, y) of the eye EYE1 is moved in the eye box BOX1. Thus, the observed brightness of a given image point remains substantially constant in a situation where the position of the eye EYE1 is moved within the eye box BOX1. The degree of spatial uniformity may be indicated e.g. by standard deviation of spatial intensity distribution. A lower standard deviation indicates a higher degree of uniformity.

Brightness of a displayed image point (P1') may be proportional to the sum of the intensity of a first output light beam $B3a_{P1}$ projected from the first expander device EPE1 and the intensity of a second output light beam $B3b_{P1}$ projected from the second expander device EPE2, in a situation where the output light beams $B3a_{P1}$, $B3b_{P1}$ correspond to the same image point P1 of the input image IMG0. The spatial intensity distribution of the output light OUT1 may be substantially uniform such that the sum of the intensities of the output light beams $B3a_{P1}$ and $B3b_{P1}$ impinging on an eye EYE1 remains substantially independent of the position (x, y) of the eye EYE1, in a situation where the eye EYE1 is moved within the eye box BOX1.

Figure 5C:
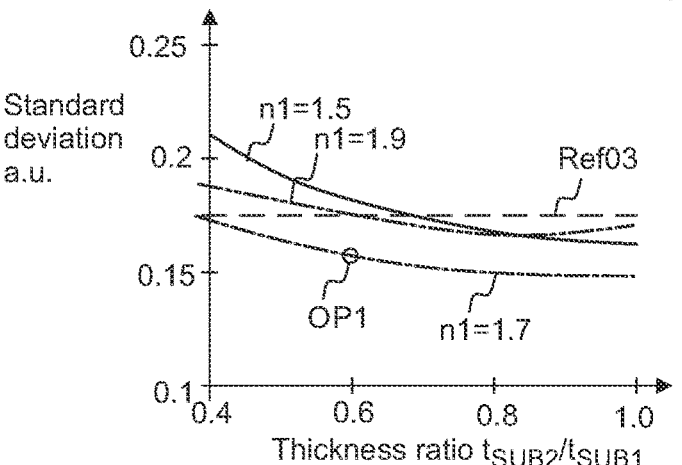
FIG. 5c shows, by way of example, standard deviation of the spatial distribution in the eye box, as the function of the thickness ratio, for several different refractive indices of the waveguiding plate of the first expander device.

FIG. 5c shows, by way of example, standard deviation of the spatial intensity distribution, as a function of the thickness ratio $t_{SUB2}/t_{SUB1}$, for three different refractive index values n1=1.5, n1=1.7, n1=1.9. The standard deviation of FIG. 5c represents the differences between intensity values observable at different positions (x, y) in the eye box BOX1.

The grating period of each diffractive element (DOE1a, DOE2a, DOE3a) of the first expander device EPE1 is equal to the grating period of the corresponding diffractive element (DOE1b, DOE2b, DOE3b) of the second expander device EPE2. In other words, $d_{1a}=d_{1b}$, $d_{2a}=d_{2b}$, $d_{3a}=d_{3b}$. In this example, the input image IMG0 is uniform, i.e. all image points of the input image IMG0 have equal brightness.

Ref03 denotes the standard deviation of the spatial intensity distribution in the eye box BOX1 in the comparative example, where the display apparatus comprises only one expander device (EPE2). The standard deviation of the spatial intensity distribution in the operating point OP1 is substantially lower (by 11%) than the standard deviation (Ref03) of the spatial intensity distribution of the comparative example.

The parameters ($t_{SUB1}$, $t_{SUB2}$, $n_1$, $n_2$) may be selected according to one or more optimization criteria. The optimization criteria may include e.g. one or more of the following:
    low standard deviation in angular space,
    low standard deviation in spatial space,
    low standard deviation in color space.

The display apparatus 500 may be arranged to display monochrome images VIMG1. The display apparatus 500 may be arranged to display e.g. green images VIMG1. In that case there is no need to optimize uniformity in color space.

The display apparatus 500 may also be arranged to display multi-color images VIMG1. The display apparatus 500 may be arranged to display e.g. RGB images VIMG1, which include red color (R), green color (G), and blue color (B). In that case the uniformity in color space may also be used as an additional optimization criterion for selecting the parameters ($t_{SUB1}$, $t_{SUB2}$, $n_1$, $n_2$).

FIG. 6a shows, by way of example, dimensions of the first expander device EPE1. The first expander device EPE1 may comprise a first group GRP1 of diffractive elements, which contribute to the direction of the output light beams. The expander device EPE1 may comprise the first group GRP1 of diffractive elements, which are implemented on the first waveguide plate SUB1. The first group GRP1 may comprise an in-coupling element DOE1a, an expander element DOE2a, and an out-coupling element DOE3a.

The in-coupling element DOE1a may have a grating period $d_{1a}$. The in-coupling element DOE1a may be implemented by a diffractive surface relief grating G1a, which has a grating period $d_{1a}$. The grating G1a comprises diffractive features F1a, which may be e.g. microscopic ridges, grooves, and/or protrusions. The grating G1a has a grating vector $V_{1a}$. The orientation of the grating vector $V_{1a}$ may be specified e.g. by an angle $\beta_{1a}$. The in-coupling element DOE1a may have a width $w_{1a}$ (in direction SX) and a height $h_{1a}$ (in direction SY).

The expander element DOE2a may have a grating period $d_{2a}$. The element DOE2a may be implemented by a diffractive surface relief grating G2a, which has a grating period $d_{2a}$. The grating G2a comprises diffractive features F2a. The grating G2a has a grating vector $V_{2a}$. The orientation of the grating vector $V_{2a}$ may be specified by an angle $\beta_{2a}$. The element DOE2a may have a width $w_{2a}$ and a height $h_{2a}$.

The out-coupling element DOE3a may have a grating period $d_{3a}$. The element DOE3a may be implemented by a diffractive surface relief grating G3a, which has a grating period $d_{3a}$. The grating G3a comprises diffractive features F3a. The grating G3a has a grating vector $V_{3a}$. The orientation of the grating vector $V_{3a}$ may be specified by an angle $\beta_{3a}$. The element DOE3a may have a width $w_{3a}$ and a height $h_{3a}$.

The magnitude of a grating vector depends on the grating period of a diffraction grating of a diffractive element, and the direction of the grating vector depends on the orientation of the diffraction grating. For example, the magnitude of the grating vector $V_{1a}$ depends on the grating period $d_{1a}$ of the diffraction grating G1a of the diffractive element DOE1a, and the direction $\beta_{1a}$ of the grating vector $V_{1a}$ depends on the orientation of the diffraction grating G1a.

The expander device EPE1 comprises several diffractive elements DOE1a, DOE2a, DOE3a in an optical path. The in-coupling element DOE1a may receive input light beams $B0_{P1}$, $B0_{P2}$ through a first major surface of the expander device EPE1. The expander device EPE1 may be designed such that the vector sum of grating vectors of the diffractive elements in the optical path is equal to zero ($V_{1a}+V_{2a}+V_{3a}=0$), so as to ensure that that each output light beam $B3a_{P1}$, $B3a_{P2}$ provided by the out-coupling element DOE3$a$ is parallel with the corresponding input light beam $B0_{P1}$, $B0_{P2}$ obtained from the optical engine ENG1.

FIG. 6$b$ shows, by way of example, dimensions of the second expander device EPE2. The expander device EPE2 may comprise a second group GRP2 of diffractive elements, which contribute to the direction of the output light beams. The expander device EPE2 may comprise the second group GRP2 of diffractive elements, which are implemented on the second waveguide plate SUB2. The second group GRP2 may comprise an in-coupling element DOE1$b$, an expander element DOE2$b$, and an out-coupling element DOE3$b$.

The elements DOE1$a$ and DOE1$b$ may perform the same function, i.e. in-coupling. In this sense, the element DOE1$b$ may correspond to the element DOE1$a$. The in-coupling element DOE1$b$ of the second expander device EPE2 may correspond to the in-coupling element DOE1$a$ of the first expander device EPE1. The expander element DOE2$b$ of the second expander device EPE2 may correspond to the expander element DOE2$a$ of the first expander device EPE1. The out-coupling element DOE3$b$ of the second expander device EPE2 may correspond to the out-coupling element DOE3$a$ of the first expander device EPE1.

The in-coupling element DOE1$b$ may have a grating period $d_{1b}$. The in-coupling element DOE1$b$ may be implemented by a diffractive surface relief grating G1$b$, which has a grating period $d_{1b}$. The grating G1$b$ comprises diffractive features $F_{1b}$, which may be e.g. microscopic ridges, grooves, and/or protrusions. The grating G1$b$ has a grating vector $V_{1b}$. The orientation of the grating vector $V_{1b}$ may be specified e.g. by an angle $\beta_{1b}$. The in-coupling element DOE1$b$ may have a width $w_{1b}$ (in direction SX) and a height $h_{1b}$ (in direction SY).

The expander element DOE2$b$ may have a grating period $d_{2b}$. The element DOE2$b$ may be implemented by a diffractive surface relief grating G2$b$, which has a grating period $d_{2b}$. The grating G2$b$ comprises diffractive features $F2_{b}$. The grating G2$b$ has a grating vector $V_{2b}$. The orientation of the grating vector $V_{2b}$ may be specified by an angle $\theta_{2b}$. The element DOE2$b$ may have a width $w_{2b}$ and a height $h_{2b}$.

The out-coupling element DOE3$b$ may have a grating period $d_{3b}$. The element DOE3$b$ may be implemented by a diffractive surface relief grating G3$b$, which has a grating period $d_{3b}$. The grating G3$b$ comprises diffractive features F3$b$. The grating G3$b$ has a grating vector $V_{3b}$. The orientation of the grating vector $V_{3b}$ may be specified by an angle $\beta_{3b}$. The element DOE3$b$ may have a width $w_{3b}$ and a height $h_{3b}$.

The expander device EPE2 may be designed such that the vector sum of the grating vectors of the diffractive elements in an optical path is equal to zero ($V_{1b}+V_{2b}+V_{3b}=0$), so as to ensure that that each output light beam $B3b_{P1}$, $B3b_{P2}$ provided by the out-coupling element DOE3$b$ is parallel with the corresponding input light beam $B0_{P1}$, $B0_{P2}$ received by the in-coupling element DOE1$b$.

The shape of each element (DOE1$a$, DOE2$a$, DOE3$a$) of the first group (GRP1) may be the same as the shape of the corresponding element (DOE1$b$, DOE2$b$, DOE3$b$) of the second group (GPR2).

The area of each element (DOE1$a$, DOE2$a$, DOE3$a$) of the first group (GRP1) may be equal to the area of the corresponding element (DOE1$a$, DOE2$a$, DOE3$a$) of the second group (GPR2), e.g. within an accuracy, which is better than 1%.

The waveguide plate SUB1, SUB2 comprises a planar waveguiding core. In an embodiment, the plate SUB1, SUB2 may optionally comprise e.g. one or more cladding layers, one or more protective layers, and/or one or more mechanically supporting layers. The thickness $t_{SUB1}$, $t_{SUB2}$ may refer to the thickness of a planar waveguiding core of the plate SUB1, SUB2

The waveguide plate SUB1,SUB2 may comprise or consist essentially of transparent solid material. The plate SUB1 may comprise e.g. glass, polycarbonate or polymethyl methacrylate (PMMA). The diffractive optical elements may be formed e.g. by molding, embossing, and/or etching. The diffractive optical elements may be implemented e.g. by one or more surface diffraction gratings. In particular, the diffractive optical elements of the first expander device EPE1 may be surface diffraction gratings, which may be implemented on the same major surface (SRF1$a$ or SRF1$b$) of the waveguide plate SUB1. Forming the elements on the same major surface may facilitate production.

The diffractive elements may be produced by using lithographic techniques. For example, one or more embossing tools may be produced by e-beam lithography, and the diffraction gratings may be formed by using the one or more embossing tools.

Referring to FIGS. 6$c$ and 6$d$, the diffractive elements DOE1$a$, DOE2$a$, DOE3$a$ of the first expander device EPE1 may be formed by an embossing tool TOOL1, and also the diffractive elements DOE1$b$, DOE2$b$, DOE3$b$ of the second expander device EPE2 may be formed by the same embossing tool TOOL1.

Using the same embossing tool TOOL1 for producing both expander devices EPE1, EPE2 may facilitate production. Using the same embossing tool TOOL1 for producing both expander devices EPE1, EPE2 may also ensure that the directions of output light beams formed by the second expander device EPE2 match with the directions of output light beams formed by the first expander device EPE1.

The method for producing the display apparatus may comprise forming the in-coupling element DOE1$a$ and the in-coupling element DOE1$b$ by using the same embossing tool TOOL1.

A group GRP1 of diffractive elements (DOE1$a$, DOE2$a$, DOE3$a$) of the first expander device EPE1 and a group GRP2 of diffractive elements (DOE1$b$, DOE2$b$, DOE3$b$) of the second expander device EPE2 may be formed by using the same embossing tool TOOL1.

The tool TOOL1 may be used as a mold or as an embossing die for forming the surface relief gratings of the diffractive elements. The diffractive features of the elements may be formed by pressing the waveguide plate SUB1 or SUB2 between the tool TOOL1 and a backing COU1. The backing COU1 may support the waveguide plate SUB1 or SUB2 during the pressing. The waveguide plate SUB1, SUB2 may be e.g. temporarily heated so as to facilitate forming the diffractive microstructures. A coating layer of the waveguide plate SUB1, SUB2 may be e.g. cured so as to make the formed diffractive microstructure more permanent.

The tool TOOL1 may comprise a first region RF1 for forming the elements DOE1$a$ and DOE1$b$. The tool TOOL1 may comprise a second region RF2 for forming the elements DOE2$a$ and DOE2$b$. The tool TOOL1 may comprise a third region RF3 for forming the elements DOE3$a$ and DOE3$b$. The regions RF1, RF2, RF3 may comprise microscopic protrusions for forming the diffractive elements of the expander devices EPE1, EPE2.

Referring to FIGS. 7a to 7e, the optical engine ENG1 may form input light IN1, which represents the input image IMG0. The optical engine ENG1 may form an input image IMG0 and may convert the input image IMG0 into a plurality of light beams $B0_{P1}$, $B0_{P2}$ of the input light IN1. The input light IN1 may comprise a plurality of input light beams ($B0_{P1}$,$B0_{P2}$) representing an input image IMG0. The optical engine ENG1 may comprise a display element DISP1 to generate the input image IMG0. The input image IMG0 may comprise a plurality of image points P1, P2 arranged in a two-dimensional array. The optical engine ENG1 may comprise collimating optics LNS1 to form a plurality of input light beams ($B0_{P1}$,$B0_{P2}$) from the image points P1, P2 of the input image IMG0.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H". The input image IMG0 may represent displayed information.

The input image IMG0 may be a monochromatic image, or a multi-color image. The input image IMG0 may be e.g. an RGB image, which may comprise a red (R) partial image, a green (G) partial image, and a blue (B) partial image. The input image IMG0 may be formed e.g. by modulating laser light or by modulating light obtained from one or more light emitting diodes.

The optical engine ENG1 may provide input light IN1, which may comprise a plurality of substantially collimated light beams $B0_{P0}$, $B0_{P1}$, $B0_{P2}$, $B0_{P3}$, $B0_{P4}$. The light $B0_{P0}$ of the center point P0 may propagate in the direction of the optical axis AX0 of the optical engine ENG1.

Referring to FIG. 7f, the displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander devices EPE1,EPE2 may form the point P0' of the displayed virtual image VIMG1 e.g. by diffracting and guiding light of the point P0 of the input image IMG0. The expander device EPE1 may form the points P1', P2', P3', P4' e.g. by diffracting and guiding light of the points P1, P2, P3, P4, respectively.

The output light OUT1 may comprise a plurality of output light beams $B3a_{P0}$, $B3a_{P1}$, $B3a_{P2}$, $B3a_{P3}$, $B3a_{P4}$, $B3b_{P0}$, $B3b_{P1}$, $B3b_{P2}$, $B3b_{P3}$, $B3b_{P4}$.

The out-coupling element DOE3a of the first expander device EPE1 may form the output light beams $B3a_{P0}$, $B3a_{P1}$, $B3a_{P2}$, $B3a_{P3}$, $B3a_{P4}$ by diffracting guided light out of the waveguide plate SUB1.

The out-coupling element DOE3b of the second expander device EPE2 may form the output light beams $B3a_{P0}$, $B3a_{P1}$, $B3a_{P2}$, $B3a_{P3}$, $B3a_{P4}$ by diffracting guided light out of the waveguide plate SUB2.

The output light OUT1 may be formed as a combination of the output light beams provided by the two or more expander devices EPE1, EPE2.

The output light beams $B3a_{P0}$ and $B3b_{P0}$ may be formed from light of the input light beam $B0_{P0}$, which corresponds to the image point P0 of the input image IMG0. The display apparatus 500 may be arranged to operate such that the direction of the output light beam $B3a_{P0}$ is parallel with the direction of the output light beam $B3b_{P0}$. The output light beams $B3a_{P0}$ and $B3b_{P0}$ may appear to originate from a point P0' of the virtual image VIMG1.

The output light beams $B3a_{P1}$, $B3b_{P1}$ may be parallel with each other, and may correspond to the image point P1 of the input image IMG0, and to the image point P1' of the virtual image VIMG1.

The output light beams $B3a_{P2}$, $B3b_{P2}$ may be parallel with each other, and may correspond to the image point P2 of the input image IMG0, and to the image point P2' of the virtual image VIMG1.

The output light beams $B3a_{P3}$, $B3b_{P3}$ may be parallel with each other, and may correspond to the image point P3 of the input image IMG0, and to the image point P3' of the virtual image VIMG1.

The output light beams $B3a_{P4}$, $B3b_{P4}$ may be parallel with each other, and may correspond to the image point P4 of the input image IMG0, and to the image point P4' of the virtual image VIMG1.

Figure 7G:
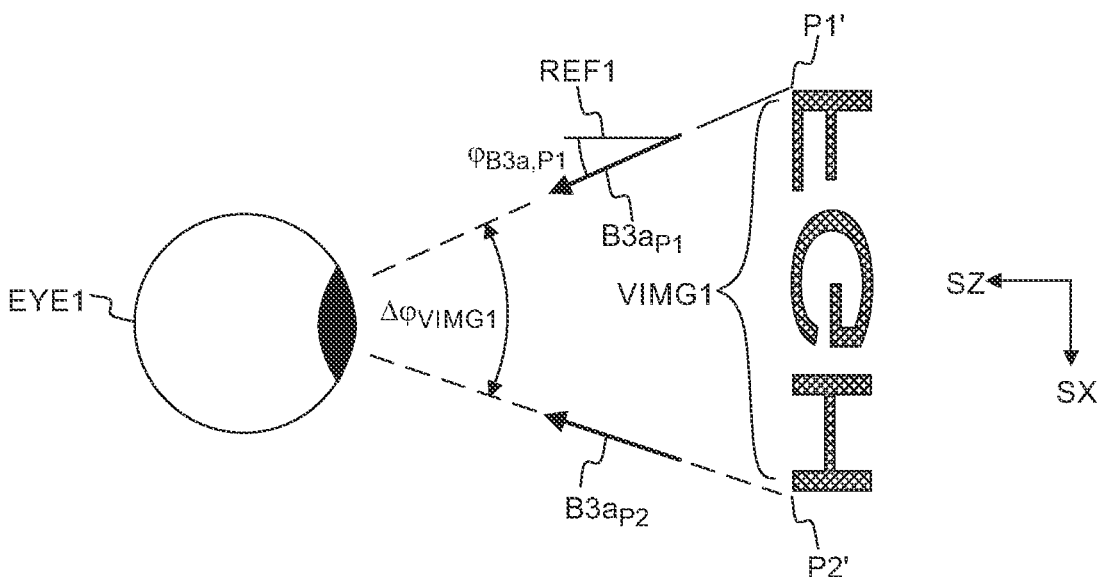
Figure 7H:
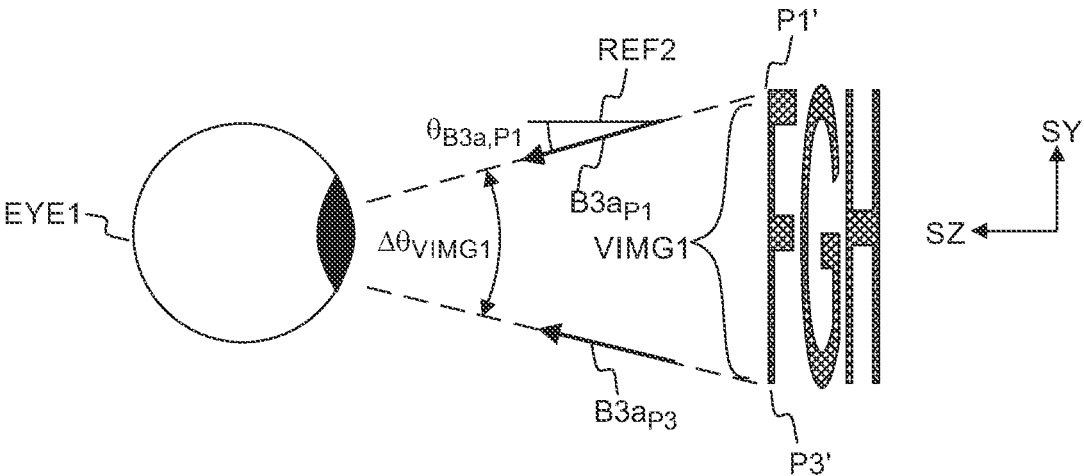

Referring to FIGS. 7g and 7h, the displayed virtual image VIMG1 has an angular width $\Delta\varphi_{VIMG1}$ and an angular height $\Delta\theta_{VIMG1}$.

The displayed virtual image VIMG1 may have a first corner point P1' e.g. at the left-hand side of the image VIMG1, and a second corner point P2' e.g. at the right-hand side of the image VIMG1. The angular width $\Delta\theta_{VIMG1}$ of the virtual image VIMG1 may be equal to the horizontal angle between the directions of the output light beams $B3a_{P1}$ and $B3a_{P2}$.

The displayed virtual image VIMG1 may have an upper corner point P1' and a lower corner point P3'. The angular height $\Delta\theta_{VIMG1}$ of the virtual image VIMG1 may be equal to the vertical angle between the directions of the output light beams $B3a_{P1}$ and $B3a_{P3}$.

The direction of a light beam may be specified e.g. by orientation angles $\varphi$ and $\theta$. The angle $\varphi$ may denote an angle between the direction of a light beam and a reference plane REF1. The reference plane REF1 may be defined e.g. by the directions SZ and SY. The angle $\theta$ may denote an angle between the direction of the light beam and a reference plane REF2. The angles $\varphi_{B3a,P1}$, $\theta_{B3a,P1}$ specify the direction of an output light beam $B3a_{P1}$, which corresponds to the image point P1.

The reference plane REF2 may be defined e.g. by the directions SZ and SX. The direction of a light beam corresponding to the point P1 may be fully specified by angles $\theta_{B3,P1}$, $\varphi_{B3,P1}$.

The input image IMG0 may represent displayed information. The input image IMG0 may represent e.g. graphics and/or text. The input image IMG0 may represent e.g. video. The engine ENG1 may be arranged to generate still images and/or video. The engine ENG1 may generate a real primary image IMG0 from a digital image. The engine ENG1 may receive one or more digital images e.g. from an internet server or from a smartphone.

The display DISP1 may comprise a two-dimensional array of display pixels. The display DISP1 may comprise a two-dimensional array of light-emitting display pixels. The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD). The display DISP1 may generate an input image IMG0 e.g. at a resolution of 1280×720 (HD). The display DISP1 may generate an input image IMG0 e.g. at a resolution of 1920×1080 (Full HD). The display DISP1 may generate an input image IMG0 e.g. at a resolution of 3840×2160 (4K UHD). The input image IMG0 may comprise a plurality of image points P0, P1, P2, .... The engine ENG1 may comprise collimating optics LNS1 to form a light beam from each image pixel. The engine ENG1 may comprise collimating optics LNS1 to form a substantially collimated light beams from light of the image points.

In an embodiment, the expander devices EPE1, EPE2 may be implemented by only two diffractive elements. The first expander device EPE1 may comprise the in-coupling element DOE1*a* to form first guided light B1*a*, wherein the out-coupling element DOE3*a* may be arranged to form the output light OUT1 by diffracting the first guided light B1*a* out of the waveguide plate SUB1. The expander device EPE1 may be implemented without the expander element DOE2*a*. The expander device EPE1 may be implemented by the two diffractive elements DOE1*a*, DOE3*a*. In the similar manner, the second expander device EPE2 may be implemented by the elements DOE1*b*, DOE3*b* without the expander element DOE2*b*. The element DOE3*b* may diffract guided light B1*b* out of the waveguide plate SUB2.

In an embodiment, the first expander device EPE1 may comprise four diffractive elements, which contribute to the direction of the output light beams. The four elements may be positioned to define an optical path from the in-coupling element DOE1*a* to the out-coupling element DOE3*a*. The in-coupling element DOE1*a* may form guided light B1*a* by diffracting input light IN1. The expander element DOE2*a* may form expanded guided light B2*a* by diffracting the guided light B1*a*. An additional expander element may form additional expanded guided light by diffracting the expanded guided light B2*a*. The out-coupling element DOE3*a* may form the output light by diffracting the additional expanded guided light out of the waveguide plate SUB1. In the similar manner, the second expander device EPE2 may comprise four diffractive elements, which contribute to the direction of the output light beams.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display apparatus, comprising:
an optical engine to form input light, which comprises a plurality of input light beams representing an input image; and
a stack of expander devices to form output light by diffractively expanding the input light, wherein the output light comprises a plurality of output light beams representing said input image,
wherein the stack comprises a first expander device and a second expander device,
wherein the first expander device comprises a first group of diffractive elements, which contribute to the direction of the output light beams,
wherein the second expander device comprises a second group of diffractive elements, which contribute to the direction of the output light beams,
wherein the first expander device comprises a first in-coupling element to diffract the input light into a waveguiding plate of the first expander device,
wherein the first expander device is arranged to transmit a part of the input light to the second expander device, wherein the second expander device comprises a second in-coupling element to diffract the transmitted part of the input light into a waveguiding plate of the second expander device,
wherein the grating period of each element of the first group is equal to the grating period of a corresponding element of the second group,
wherein a refractive index of the first in-coupling element is different from a refractive index of the second in-coupling element.

2. The apparatus of claim 1, wherein a thickness of the waveguiding plate of the first expander device is different from a thickness of the waveguiding plate of the second expander device.

3. The apparatus according to claim 1, wherein the waveguiding plate of at least one of the expander devices is formed of two or more material layers.

4. The apparatus according to claim 1, wherein the thicknesses of the waveguiding plates or refractive indices of the diffractive elements have been selected such that the output light projected by the second expander device at least partly compensate non-uniformity of output light projected by the first expander device.

5. The apparatus according to claim 1, wherein the shape of each element of the first group is the same as the shape of the corresponding element of the second group.

6. The apparatus according to claim 1, wherein the area of each element of the first group is equal to the area of the corresponding element of the second group within an accuracy, which is better than 1%.

7. The apparatus according to claim 1, wherein the first group comprises:
a first diffractive in-coupling element to form first guided light by diffracting the input light into the first waveguide plate,
an expander element to form second guided light by diffracting the first guided light, and
an out-coupling element to form output light by diffracting the second guided light out of the first waveguide plate,
wherein the second group comprises:
a second diffractive in-coupling element to form third guided light by diffracting transmitted input light into the second waveguide plate,
an expander element to form fourth guided light by diffracting the third guided light, and
an out-coupling element to form the output light by diffracting the fourth guided light out of the second waveguide plate.

8. The apparatus according to claim 1, wherein the first in-coupling element and the second in-coupling element are formed by using the same embossing tool.

9. The apparatus according to claim 1, wherein the first group of diffractive elements and the second group of diffractive elements are formed by using the same embossing tool.

10. A method for displaying an image by using a display apparatus, the display apparatus comprising:
an optical engine to form input light, which comprises a plurality of input light beams representing an input image; and
a stack of expander devices to form output light by diffractively expanding the input light, wherein the output light comprises a plurality of output light beams representing said input image,
wherein the stack comprises a first expander device and a second expander device, wherein the first expander device comprises a first group of diffractive elements, which contribute to the direction of the output light beams, wherein the second expander device comprises a second group of diffractive elements, which contribute to the direction of the output light beams, wherein the first expander device comprises a first in-coupling element to diffract the input light into a waveguiding plate of the first expander device, wherein the first expander device is arranged to transmit a part of the input light to the second expander device, wherein the second expander device comprises a second in-coupling element to diffract the transmitted part of the input light into a waveguiding plate of the second expander device, wherein the grating period of each element of the first group is equal to the grating period of a corresponding element of the second group, wherein a refractive index of the first in-coupling element is different from a refractive index of the second in-coupling element, the method comprising:
    forming the input light, which comprises light beams corresponding to points of the input image,
    forming the output light by using the stack to diffractively expand the input light.

11. A display apparatus, comprising:
an optical engine to form input light, which comprises a plurality of input light beams representing an input image; and
a stack of expander devices to form output light by diffractively expanding the input light, wherein the output light comprises a plurality of output light beams representing said input image,
wherein the stack comprises a first expander device and a second expander device,
wherein the first expander device comprises a first group of diffractive elements, which contribute to the direction of the output light beams,
wherein the second expander device comprises a second group of diffractive elements, which contribute to the direction of the output light beams,
wherein the first expander device comprises a first in-coupling element to diffract the input light into a waveguiding plate of the first expander device,
wherein the first expander device is arranged to transmit a part of the input light to the second expander device,
wherein the second expander device comprises a second in-coupling element to diffract the transmitted part of the input light into a waveguiding plate of the second expander device, wherein the grating period of each element of the first group is equal to the grating period of a corresponding element of the second group, wherein a thickness of the waveguiding plate of the first expander device is different from a thickness of the waveguiding plate of the second expander device.

12. The apparatus according to claim 11, wherein the waveguiding plate of at least one of the expander devices is formed of two or more material layers.

13. The apparatus according to claim 11, wherein the thicknesses of the waveguiding plates or refractive indices of the diffractive elements have been selected such that the output light projected by the second expander device at least partly compensate non-uniformity of output light projected by the first expander device.

14. The apparatus according to claim 11, wherein the shape of each element of the first group is the same as the shape of the corresponding element of the second group.

15. The apparatus according to claim 11, wherein the area of each element of the first group is equal to the area of the corresponding element of the second group within an accuracy, which is better than 1%.

16. The apparatus according to claim 11, wherein the first group comprises:
    a first diffractive in-coupling element to form first guided light by diffracting the input light into the first waveguide plate,
    an expander element to form second guided light by diffracting the first guided light, and
    an out-coupling element to form output light by diffracting the second guided light out of the first waveguide plate,
    wherein the second group comprises:
        a second diffractive in-coupling element to form third guided light by diffracting transmitted input light into the second waveguide plate,
        an expander element to form fourth guided light by diffracting the third guided light, and
        an out-coupling element to form the output light by diffracting the fourth guided light out of the second waveguide plate.

17. The apparatus according to claim 11, wherein the first in-coupling element and the second in-coupling element are formed by using the same embossing tool.

18. The apparatus according to claim 11, wherein the first group of diffractive elements and the second group of diffractive elements are formed by using the same embossing tool.

* * * * *